United States Patent [19]

Langer, Jr.

[11] 4,094,818

[45] June 13, 1978

[54] ZIEGLER TYPE CATALYST SYSTEM

[75] Inventor: Arthur W. Langer, Jr., Watchung, N.J.

[73] Assignee: Exxon Research & Engineering Co., Linden, N.J.

[21] Appl. No.: 767,766

[22] Filed: Feb. 11, 1977

[51] Int. Cl.² .......................... B01J 31/02; B01J 31/12
[52] U.S. Cl. .......................... 252/429 C; 252/431 N; 526/153
[58] Field of Search ........................ 252/429 C, 431 N

[56] References Cited

U.S. PATENT DOCUMENTS

| | | | |
|---|---|---|---|
| 3,135,724 | 6/1964 | Price | 252/429 C |
| 3,418,304 | 12/1968 | Langer et al. | 252/429 C |
| 3,489,736 | 1/1970 | Takahashi et al. | 252/429 C |
| 3,503,947 | 3/1970 | Kosaka et al. | 252/429 C |
| 3,642,746 | 2/1972 | Kashiwa et al. | 252/429 C X |
| 3,723,348 | 3/1973 | Apotleker et al. | 252/431 N X |
| 3,905,913 | 9/1975 | Gorbellini et al. | 252/429 C X |

FOREIGN PATENT DOCUMENTS 4,635,847   1971   Japan.

*Primary Examiner*—Patrick P. Garvin
*Assistant Examiner*—William G. Wright
*Attorney, Agent, or Firm*—Richard E. Nanfeldt

[57] ABSTRACT

A new improved Ziegler type catalyst system for alpha-olefin type polymerization includes $R'_3Y$ or $R'_2YX$ and mixtures thereof, at least one Group IVB-VIII transition metal halide and an alkyl metal compound selected from $R'_2YNR_2$ and $R'XYNR_2$, wherein Y is Al, Ga or In. The improved catalyst system provides increased polymerization activity without significantly affecting the crystallinity of the polymer.

8 Claims, No Drawings

ZIEGLER TYPE CATALYST SYSTEM

FIELD OF THE INVENTION

A new improved Ziegler type catalyst system for alpha-olefin type polymerization includes $R'_3Y$ or $R'_2YX$ and mixtures thereof, at least one Group IVB-VIII transition metal halide, and $R'_2YNR_2$ or $R'XYNR_2$ at a concentration level of about 0.05 to about 5.0 mole per mole of $TiCl_3$, wherein X is a halide, R' is selected from the group consisting of $C_1$ to $C_{20}$ alkyl, branched alkyl, naphthenic, or aralkyl groups, R is selected from the group consisting of $C_3$ to $C_{10}$ bulky alkyl groups, cycloalkyl groups, or a cyclic amine group, and Y is selected from the group consisting of aluminum, gallium or indium. The improved catalyst system provides increased polymerization activity without significantly affecting the crystallinity of the polymer because the alkyl metal compound selectively removes $R'AlX_2$ from the surface of $TiCl_3$ where it is believed to normally act as a poison, wherein the $R'AlX_2$ is a by-product formed in initial catalyst manufacture and during the course of polymerization which tends to promote the formation of polymers having a low degree of crystallinity.

BACKGROUND OF THE INVENTION

There is extensive art on the polymerization of ethylene and higher alpha-olefins, including dienes, using Ziegler-type catalysts containing either alkyl metals or alkyl metals in which an alkyl group has been replaced by X, OR, SR, $NR_2$, etc., in combination with a transition metal compound of Groups IVB-VIII, where X = halide and R = $C_1$ to $C_{20}$ hydrocarbyl substituent.

For the commercial stereospecific polymerization of propylene and higher alpha olefins, only a few alkyl metal compounds have been found effective in combination with titanium or vanadium chlorides. Commercially, only $R_2AlCl$ or $R_3Al$ are used together with a crystalline form of $TiCl_3$ or $TiCl_3 \cdot nAlCl_3$. Mixtures of $R_3Al$ and $R_2AlCl$ and $RAlCl_2$ are made in situ and have been disclosed as catalyst components frequently in the art. R is preferably ethyl (Et) or isobutyl; $n = 0.01$ to $0.75$.

It is also well known that, in propylene polymerizations using $TiCl_3$, catalyst activity decreases sharply in the series $AlEt_3$, $Et_2AlCl$, $EtAlCl_2$ (Malatesta, *Can. J. Chem.* 37. 1176 (1959) and Boldyreva et al, Vysokomolekul. *Soedin* 1, 900 (1959); C. A. 55, 245a (1961). When the chloride in $Et_2AlCl$ is replaced by OR, SR, SeR or $NR_2$, activity and polymer isotacticity usually drop drastically (Danusso, *J. Polymer Sci. C4*, 1497 (1964)).

In the present inventor's research, $Et_2AlOEt$ and $Et_2AlNEt_2$ were found to have some activity with $TiCl_3$, but the polypropylene obtained was nearly atactic (Langer, Seventh Biennial Polymer Symposium, Florida, 12/8/74). Therefore, the art teaches that both activity and polymer isotacticity are extremely low when $R_2AlNR_2$ (aluminum amide) compounds are used as replacements for conventional alkyl metal cocatalyst components.

This inventor's U.S. Pat. No. 3,418,304 discloses a complex of alkyl metal compounds such as $Et_2AlNEt_2$ and Lewis acid salts such as $AlCl_3$ and $MgCl_2$, e.g. $Et_2AlNEt_2 \cdot AlCl_3$ as cocatalysts to entirely replace conventional aluminum alkyls, but such complexes are entirely different from the concept of utilizing certain metal amides as catalyst supplements for conventional Ziegler systems with $Et_3Al$ or $Et_2AlCl$ as cocatalysts.

U.S. Pat. No. 3,255,169 discloses a Ziegler catalyst system employing aluminum hydroaminate compounds. Typical of these is $HAl(NHC_2H_5)_2$ which is used as a total substitution for the conventional aluminum alkyl cocatalyst.

Recently, U.S. Pat. No. 3,905,913 has issued disclosing the use of

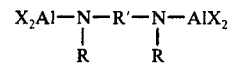

where X is H or halogen, both Rs are hydrocarbon radicals; and R' is a divalent hydrocarbon radical. These compounds are not closely related to thoes of the invention herein. And they are used as the sole aluminum-containing cocatalyst component.

SUMMARY OF THE INVENTION

The present instant invention relates to unique and novel improved Ziegler type catalyst systems for the conventional alpha-olefin type polymerizations thereby yielding polymers having a high degree of isotactic stereoregularity.

An object of my present invention is to provide improved Ziegler type catalyst systems having a major increase in polymerization activity while being able to control the polymer crystallinity over a wide range, e.g. isotacticity, wherein the catalyst system includes at least one Group IVB-VIII transition metal halide, an alkyl metal cocatalyst selected from the group consisting of $R'_3Y$ or $R'_2YX$ and mixtures thereof and an alkyl metal compound being selected from $R'_2YNR$ and $R'XYNR_2$, wherein R' is selected from the group consisting of $C_1$ to $C_{20}$ alkyl, branched alkyl, naphthenic, or aralkyl groups, X is a halide group, R is selected from the group consisting of $C_3$ to $C_{10}$ bulky alkyl groups, cycloalkyl groups, or a cyclic amine structure, and Y is selected from the group consisting of aluminum, gallium or indium.

A further object of my present invention is to provide an improved process for alpha-olefin type polymerizations, wherein the polymerization activity is increased without adversely affecting the crystallinity of the formed polymer.

A still further object of my present invention is to provide an improved Ziegler type catalyst system wherein catalyst poisons are consumed in situ thereby minimizing the formation of atactic type polymers wherein the catalyst poison $R'AlX_2$ is effectively removed from the catalyst thereby making a higher number of active sites.

A still further object is the advantage over the alternative catalysts of being able to use the instant compounds directly with any type of transition metal halide without modification of the commercial catalyst preparation or the polymerization plant.

GENERAL DESCRIPTION

During a Ziegler type alpha-olefin polymerization which employs $TiCl_3$ in combination with $R'_3Y$ or $R_2'YX$, the by-product $R'YX_2$ is formed on the surface of the $TiCl_3$ thereby acting as a catalyst poison (deactivator), wherein R' is selected from the group consisting of $C_1$ to $C_{20}$ alkyl, branched alkyl, naphthenic or aralkyl groups, preferably a $C_2$ to $C_4$ alkyl group, X is a halide group, Y is selected from the group consisting of Al, Ga or In.

It has been shown that the addition of small amounts of $EtAlCl_2$ to a $TiCl_3$—$Et_2AlCl$ catalyst system dramatically reduces polymerization rates (Ingberman, et al, *J. Polymer Sci. A4*, 2781 (1966)). Since the formation of an active catalyst site during polymerization involves the reaction $R'_2AlCl + TiCl_3 \rightarrow R'AlCl_2 + R'TiCl_2$ on the surface of the $TiCl_3$ crystal, it is apparent that the $R'AlCl_2$ catalyst poison (or deactivator) is always present in such catalyst systems. Likewise for the reaction of $R'_3Al$ with excess $TiCl_3$ is:

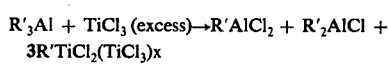

It has been surprisingly found that this catalyst poison $R'AlX_2$ can be effectively removed from the surface of the $TiCl_3$ by the addition of a compound $R'_2YNR_2$ or $R'XYNR_2$ to the $TiCl_3$-$R'_3Al$ or $TiCl_3$-$R'_2AlX$. The $R'_2YNR_2$ reacts selectively with $R'AlX_2$ in two different ways either to remove the $R'AlX_2$ by the formation of mixed dimers:

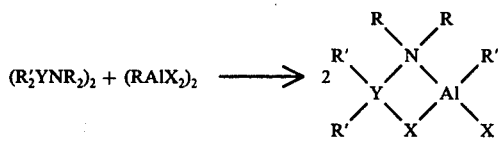

or by transalkylation to regenerate $R'_2AlX$ and to generate $R'XYNR_2$: $R_2'YNR_2 + R'AlX_2 \rightarrow R'XYNR_2 + R'_2AlX$. In the case of $R'XYNR_2$, the $R'AlX_2$ is simply removed by formation of a catalytically inactive mixed dimer. In either case, the $R'AlX_2$ is effectively removed from the catalyst sites, thereby resulting in a higher number of active sites per unit of catalyst volume which is reflected in a large increase in activity. When the amide ($R'_2YNR_2$) of the present instant invention is used in relatively small amounts based on the $R'_3Al$ or $R'_2AlX$, the polymer isotacticity (as measured by heptane insolubles, density, tensile, etc.) is similar to or higher than that obtained with either $R'_3Al$ or $R'_2AlX$ alone. When higher proportions are used relative to $R'_2AlX$ or $R'_3Al$, the polymer becomes less isotactic, but polymerization rates increase to even higher levels. Thus, one can achieve remarkable increases in activity from any $TiCl_3$ or $RiCl_4$ catalyst while simultaneously controlling polymer isotacticity over a wide range. Another advantage the cocatalyst supplement of the invention has over alternative catalysts is that it may be used directly with any type of $TiCl_3$ or $TiCl_4$ presently being used without modification of the commercial catalyst preparation or the polymerization plant.

The amides usable in the invention have the general structures $R'_2AlNR_2$ and $R'XAlNR_2$, where $R' = C_1$ to $C_{20}$ hydrocarbyl group such as alkyl, cycloalkyl or aralkyl, preferably a $C_{1=12}$ alkyl; and $R = C_3$ to $C_{10}$ bulky alkyl or cycloalkyl groups, including ring structures such as $R_2Al$ piperidide and $Et_2Al$ pyrrolidide. Sterically hindered amide groups are especially preferred because they interact less strongly with the $TiCl_3$ and have greater driving force to form mixed dimers with the $R'AlCl_2$ poison. Such compounds have large, bulky R groups by virtue of branching on the carbons alpha, beta or gamma to the nitrogen. Illustrative examples of R groups include isopropyl, isobutyl, neopentyl, 3,3-diethylhexyl, 2-ethylhexyl, 2-butyl, 2-octyl, 3-pentyl, cyclohexyl, cyclopentyl, 2-methylcyclopentyl, 3-ethylcyclohexyl, and mixtures including mixtures in which one R group may be a less bulky saturated group such as a normal alkyl. Also, the two R groups may be part of a cyclic amine structure, such as pyrrolidyl, piperidyl, and the like and their various alkyl substituted derivatives especially when the substituents are on the carbon atoms adjacent to the nitrogen atoms, such as 2,6-dimethylpiperidide, 2,2,6,6-tetramethylpiperidide, and the like.

The Y group of $R_2'YNR_2$ is selected from the group consisting of aluminum, gallium, or indium, most preferably aluminum.

The metal amide compound will be useful providing that the Y—N bond is fairly stable to exchange reactions with Al—R, Ti—R, and Ti—Cl bonds.

It is desirable for any metal-alkyl (M—R) bonds to be relatively unreactive to the Al and Ti compounds except in transalkylation reactions with $R'AlCl_2$. In some cases, organometal alkoxides may be used in place of the amides, but these are less preferred because they more readily participate in active site formation than amides and produce less active or less stereospecific sites. Phosphides may also be used.

The ratio of amide to $TiCl_3$ is between about 0.05:1 to 5:1. The lower ratios are used together with "low aluminum" containing $TiCl_3$ to make highly isotactic polymers at high rates. Higher ratios are used with aluminum-containing $TiCl_3$ catalysts such as the commercial $TiCl_3 \cdot 0.33$ $AlCl_3$ catalyst. Ratios up to 5:1 may be used with supported $TiCl_3$ or $TiCl_4$ catalysts or to obtain lower isotacticity polymer at very high rates. "Low-aluminum" containing $TiCl_3$ refers to $TiCl_3$ catalysts which have low Al because of method of formation or have had a major portion of the aluminum removed as a result of subsequent reactions.

These new cocatalyst mixtures are useful with any of the crystal modifications of $TiX_3$, with solid solutions of Groups II-III metal salts in $TiX_3$ (also referred to as "cocrystallized" such as $TiCl_3 \cdot nAlCl_3$ or $TiCl_3 \cdot nMgCl_2$, and with $TiX_3$ or $TiX_4$ supported on salts such as $MgCl_2$ or hydroxychloride, oxides or other inorganic or organic supports, wherein X = Cl or Br, preferably Cl. Lewis bases, alcohols, carboxylic acids, etc. may also be present. The most preferred crystal structure is delta or pseudo delta, the latter being a mixture of disordered, very small alpha and gamma crystallites. This invention is also useful for increasing the activity and/or stereospecificity of supported $TiCl_4$ and $TiCl_3$-type catalysts and other supported predominantly trivalent titanium compounds. The $TiCl_3$-type catalysts may be prepared from $TiCl_4$ by any of the reduction and crystallization procedures known in the art ($H_2$, metal, metal hydrides, alkyl, etc.). Low aluminum $TiCl_3$ type catalysts are preferred.

Further increases in activity or stereospecificity may be obtained by premixing the transition metal component with either the amide or the alkyl metal, or both.

The amide effect is obtained with all the usual polymerization conditions. Thus solvent, temperature and monomer concentrations are not critical. Increased activity is obtained with all alpha olefins from ethylene to $C_{10}$ and higher as well as in copolymerizations such as ethylene/α-olefin, ethylene/diolefin, propylene/α-olefin, propylene/diolefin and ethylene/α-olefin/diene copolymerizations. The amount of alkyl metal cocatalyst is usually in the range of 0.1:1 to 20:1, preferably about 0.5:1 to 10:1 mole ratio of alkyl metal to transition metal compound.

The concept of the invention can be restated as follows. Two types of alkyl metal compounds have been found to be effective for greatly increasing the activity of Ziegler catalysts, especially for propylene polymerization. These are alkyl aluminum dialkylamides and alkyl chloroaluminum dialkyl amides. The amides most preferably are sterically hindered. Both types are believed to operate by selectively scavenging the R'AlCl$_2$ poison from the catalyst through the formation of mixed dimers. The dialkylaluminum additives are preferred because they regenerate the desirable R$_2$AlCl by reaction with RAlCl$_2$. However, the corresponding alkyl chloroaluminum amides are also effective additives for simply scavenging RAlCl$_2$. These latter have the advantage over the dialkylaluminum types in that they have little, if any, polymerization activity so that the amounts used need not be so carefully controlled.

When the dialkylaluminum amide additives are used in excess over the amount of R'AlCl$_2$ produced by the catalyst reactions, they are capable of forming active sites which yield lower isotacticity polymer. Therefore, these additives are preferably used in about 5 to 50 mole % based on titanium in the absence of extrinsic sources of R'AlCl$_2$. About 50–100 mole % should be used when added R'AlCl$_2$ plus that formed by reacting R'$_2$ AlCl with AlCl$_3$ in the titanium component is in the overall polymerization system. Up to 5 moles additive per 1 Ti may be used for supported TiCl$_4$ catalysts. Thus, the broad mole ratios are from about 0.05:1 to 5:1 of alkyl Al amide to titanium in the catalyst. The best results are obtained when the molar amount of additive is approximately equal to the molar amount of R'AlCl$_2$ produced before and during polymerization.

The alkyl groups on the aluminum compound containing about 2 to 12 carbons per alkyl group all produce higher activity catalysts. However, for propylene and higher alpha olefins, polymer isotacticity decreases with increasing alkyl chain length. Therefore, C$_2$ to C$_4$ alkyl groups are preferred when isotactic polymers are desired.

The halide group in the aluminum components of the catalyst is preferably chloride or bromide, with chloride being most preferred.

The alkyl groups attached to the amide nitrogen are preferably attached to secondary or tertiary carbons to achieve sufficient steric hindrance. Primary alkyls are useful only when there is sufficient branching on the carbon atom beta or gamma to the nitrogen. Open chain as well as cyclic groups may be used. The most preferred groups are isopropyl and cyclohexyl groups.

The additives appear to be useful with any Group IVB-VIIIB Ziegler transition metal catalyst which produces R'AlCl$_2$ poison by reaction with aluminum alkyls. Trivalent titanium and vanadium chlorides are preferred with those having low aluminum content being most preferred. The additives also appear to be generally useful for any monomer and mixtures of monomers.

DETAILED DESCRIPTION OF THE PREFERRED EMBODIMENTS

The advantages of the unique and novel catalysts system, the process for the alpha-olefin polymerization and the unique and novel compositions of the mixed dimers of the present instant invention can be more readily appreciated by reference to the following examples and tables.

EXAMPLE 1

A series (A-G) of polymerization runs was carried out in a 1 liter baffled resin flask fitted with an efficient reflux condenser and a high speed stirrer. In a standard procedure for propylene polymerizations, 475 ml n-heptane (<1 ppm water) containing 10 mmole Et$_2$AlCl (12.0 g) was charted to the reactor under dry N$_2$ heated to reaction temperature (65° C) and saturated with pure propylene at 765 mm pressure. The TiCl$_3$ (1.00 g) (6.5 mmole) was charged to a catalyst tube containing a stopcock and a rubber septum cap. Polymerization started when the TiCl$_3$ was rinsed into the reactor with 25 ml n-heptane from a syringe. Propylene feed rate was adjusted to maintain an exit gas rate of 200–500 cc/min at a pressure of 765 mm. After one hour at temperature and pressure, the reactor slurry was poured into one liter isopropyl alcohol, stirred 2–4 hours, filtered, washed with alcohol and vacuum dried.

The TiCl$_3$ was prepared by reduction of TiCl$_4$ with Et$_2$AlCl followed by treatment with diisopentyl ether and TiCl$_4$ under controlled conditions, yielding a high surface area delta TiCl$_3$ having low aluminum content (hereinafter "low aluminum" TiCl$_3$).

In Runs B-E, the diethyl aluminum diisopropylamide (Et$_2$AlN(iPr)$_2$) was added to the reactor together with the Et$_2$AlCl. The results summarized in Table I following show that activity increased sharply up to 1 mmole amide, then more slowly up to 3 mmoles amide. The percent heptane insolubles (also called isotacticity index) remained essentially constant, then decreased slightly at 3 mmoles amide.

Runs F and G show that still larger increases in activity are obtained by premixing the TiCl$_3$ with either the amide or the Et$_2$AlCl.

Thus, the addition of only 5–30 mole % amide based on Et$_2$AlCl, or about 7–50 mole % based on TiCl$_3$, resulted in 25–250 percent increase in polymerization rate over Control Run A.

The increased activity was not due simply to higher dialkyl aluminum concentration because 13 mmoles Et$_2$AlCl gave only 34.1 activity.

TABLE I

| | PROPYLENE POLYMERIZATION Et$_2$AlN(iPr)$_2$ Additive | | |
|---|---|---|---|
| Run | Et$_2$AlN(iPr)$_2$ Mmoles | Rate g/g TiCl$_3$/hr | % Heptane Insolubles(a) |
| A(Control) | 0 | 34.2 | 95.7 |
| B | 0.5 | 48.2 | 94.7 |
| C | 1 | 52.2 | 93.3 |
| D | 2 | 51.8 | 94.9 |
| E | 3 | 54.2 | 92.0 |
| F | 2(b) | 65.2 | 94.6 |
| G | 3(c) | 83.2 | 91.7 |

(a)Insoluble in boiling n-heptane based on total product, including alcohol-solubles minus catalyst.
(b)Mixed TiCl$_3$ + amide in 12 ml n-heptane, 50° C. 15 min. before charging to reactor containing the Et$_2$AlCl.
(c)Mixed TiCl$_3$ + Et$_2$AlCl in 10 ml n-heptane, 25° C 30 min. before charging to reactor containing the Et$_2$AlN(iPr)$_2$.

The results as shown by the above data are that the technique of the invention can be used to more than double activity without a significant decrease in the heptane solubles of the resulting polymer.

EXAMPLE II

The procedure of Example I was repeated for additional Runs H-N except that diethyl aluminum dicyclohexylamide (E$_2$AlN(cyC$_6$)$_2$ was used instead of the diisopropylamide. Commercial delta cocrystallized TiCl$_3$·0.33 AlCl$_3$ (Stauffer AA grade) (1.00 g) (5 mmoles) was used instead of TiCl$_3$. (This commercial TiCl$_3$ catalyst has lower activity than the "low-aluminum TiCl$_3$ catalyst" used in Example I). By "co-crystallized" it is meant that the AlCl$_3$ is an integral part of the crystal lattice of the TiCl$_3$. The results are summarized as follows in Table II.

TABLE II

PROPYLENE POLYMERIZATION
Et$_2$AlN(cyC$_6$)$_2$ Additive

| Run | EtAlN(cyC$_6$)$_2$ Mmoles | Rate g/g TiCl$_3$ AA/hr | % Heptane Insolubles[a] |
|---|---|---|---|
| H(Control) | 0 | 20.9 | 93.7 |
| I | 0.30 | 23.7 | 94.0 |
| J | 0.625 | 28.5 | 93.8 |
| K | 2 | 36.8 | 89.9 |
| L | 3 | 40.0 | 84.7 |
| M | 2[b] | 32.3 | 93.0 |
| N | 2[c] | 30.9 | 94.0 |

[a]Same as (a) in Table I
[b]Premixed TiCl$_3$·0.33 AlCl$_3$ + amide in 10 ml n-heptane, 25° C, 30 min. before charging to reactor containing the Et$_2$AlCl.
[c]Premixed TiCl$_3$·0.33 AlCl$_3$ + Et$_2$AlCl in 5 ml n-heptane, 25° C, 30 min. before charging to reactor containing the Et$_2$AlN(cyC$_6$)$_2$.

The results in Table II show that activity nearly doubled upon addition of 3 mmoles amide (60 mole % on TiCl$_3$). In contrast to the results in Example I using an essentially aluminum-free TiCl$_3$, the polypropylene isotacticity decreased substantially with increasing amounts of amide, but at least a 40% increase of activity could be obtained without loss of isotacticity.

Runs M and N show that premixing either the amide or the Et$_2$AlCl with TiCl$_3$·0.33 AlCl$_3$ resulted in a smaller activity increase than was obtained without premixing (Run K), but the heptane insolubles were raised back up to the Control (Run H). Thus, with premixing an approximately 60% increase in activity could be obtained without loss of isotacticity.

EXAMPLE III

The procedure of Example II, Run K, was repeated except that 2 mmoles diethyl aluminum diethylamide was added instead of dicyclohexylamide. Polymerization rate was 24.9 g/g TiCl$_3$·0.33 AlCl$_3$/hr and heptane insolubles was 94.1 percent. Therefore, the unhindered diethylamide was much less effective than the hindered dicyclohexylamide in increasing catalyst activity.

EXAMPLE IV

The procedure of Example I, Runs B and D, was repeated using diethyl aluminum dicyclohexylamide with similar results (40.3 and 47.6 g/g TiCl$_3$/hr vs 34.2 for the Control).

EXAMPLE V

The procedure of Example I, Run E was followed except that brown TiCl$_3$ (most beta) was used (prepared by mixing Et$_2$AlCl + TiCl$_4$ in n-hexane at −30° C and heating to 65° C for 1 hr, filtered, washed with n-hexane and vacuum dried). Polymerization rate increased to 41.4 g/g TiCl/hr from 18.0 for the Control run performed in the absence of Et$_2$AlN(iPr)$_2$.

EXAMPLE VI

A titanium catalyst supported on MgCl$_2$ was prepared by ball milling 20 g anhydrous MgCl$_2$. Six ml ethylbenzoate and 3 ml methylpolysiloxane for 100 hr at room temperature. The solid was treated with an equimolar amount (based on MgCl$_2$) of 1 M AlEt$_3$ at 100° C for 1.5 hours, filtered and washed with heptane. This produce was treated with excess 40% TiCl$_4$ in heptane at 65° C, 2 hours, then with 90% TiCl$_4$, 65° C, 1.5 hours, washed thoroughly with heptane and vacuum dried, yielding a brown powder containing both TiCl$_3$ and TiCl$_4$. The procedure of Example I, Runs A (Control) and D were followed except that 1 g of the supported catalyst was used in place of TiCl$_3$. Polymerization rate in the presence of amides increased to 75.7 from 21.1 in the Et$_2$AlCl Control. Heptane insolubles increased to 46.4 from 35.8.

EXAMPLE VII

Polymerization runs were made in a stirred autoclave at 100 psi propylene pressure plus hydrogen for molecular weight control using pentane diluent, 60° C, 2 hours. The Control run using 10 mmoles Et$_2$AlCl/5 mmoles TiCl$_3$·0.33 AlCl$_3$ (Stauffer AA grade) produced 495 g polypropylene/g TiCl$_3$. Repeating the same run but also adding 2.5 mmoles Et$_2$AlN(iPr)$_2$ increased catalyst efficiency to 612 g/g TiCl$_3$.

EXAMPLE VIII

Ethylene was polymerized following the procedure of Example I, Run A. During the first 25 minutes, the ethylene absorption rate decreased from 370 cc/min to 330 cc/min. At this point, 3 mmoles Et$_2$AlN(iPr)$_2$ in 10 ml n-heptane was added. The ethylene absorption rate gradually increased to 360 cc/min during the next 35 minutes. Thus, the rate of ethylene polymerization is also increased by the addition of a dialkylaluminum amide, but the effect is much smaller than for propylene polymerization.

EXAMPLE IX

An ethylene-propylene copolymerization was carried out in a similar manner to the procedure of Example VIII except that only 0.5 g TiCl$_3$ plus 5 mmoles Et$_2$AlCl was used. The monomer feed rates were set at 150 cc/min ethylene and 1350 cc/min propylene. During the first 20 minutes, the absorption rate was 550 cc/min. At this point, 1.5 mmoles Et$_2$AlN(iPr)$_2$ in 10 ml n-heptane was added and the absorption rate increased to 750 cc/min for the next 15 min.

EXAMPLE X

The procedure of Example I was followed for a series of Runs T'-X' and AA except that halogenated aluminum amides were used together with various alkyl aluminum compounds. The preparation of low aluminum TiCl$_3$ prepared by the technique described in Example I was used. The results are summarized as follows in Table IV.

TABLE IV

| Run | Mmole R$_n$AlX$_{3-n}$ | Mmoles RXAlN(iPr)$_2$ | Relative Activity | % Heptane Insoluble |
|---|---|---|---|---|
| Control | 10 Et$_2$AlCl | — | 100 | 95.6 |
| T' | — | 5 EtClAlN(iPr)$_2$ | 8.2 | — |
| U' | 5 EtAlCl$_2$ | 5 EtClAlN(iPr)$_2$ | 8.7 | — |
| V' | 5 Et$_2$AlCl | 5 EtClAlN(iPr)$_2$ | 155 | 94.0 |
| W' | 5 Et(C$_{12}$)AlCl | 5 EtClAlN(iPr)$_2$ | 180 | 83.2 |
| X' | 5 (C$_{12}$)$_2$AlCl | 5 EtClAlN(iPr)$_2$ | 86 | 54.2 |
| AA | 5 AlEt$_3$ | 5 EtClAlN(iPr)$_2$ | 576 | 62.0 |
| BB | 10 Et$_2$AlCl | 2 EtClAlN(iPr)$_2$ | 157 | 93.9 |

The data from these experiments show the following: (1) Aluminum amides containing less than two alkyl groups are inactive alone (Run T) or when mixed with RAlCl$_2$ (Run U), because no R$_2$AlCl is present for active site formation. (2) Alkyl chloroaluminum amides increase the activity of catalysts containing $R_2AlCl$ (Runs V', W' and BB). (3) Long chain alkyl groups in the $R_2AlCl$ component decrease heptane insolubles (Runs W' and X'). (4) $AlEt_3$ yields very high activity in the presence of the amide (Run AA) but heptane insolubles are substantially less than in the $Et_2AlCl$ control. (5) Increasing the ratio of $Et_2AlCl$: amide from 5:5 (Run V) to 10:2 (Run BB) gave no additional improvement in activity or heptane insolubles.

Since many modifications and variations of this invention may be made without departing from the spirit or scope of the invention thereof, it is not intended to limit the spirit or scope thereof to the specific examples thereof.

What is claimed is:

1. An improved catalyst composition adaptable for use in an alpha-olefin polymerization which comprises a mixture of:
   (a) at least one Group IVB to VIII transition metal halide;
   (b) an alkyl metal cocatalyst, said cocatalyst being selected from the group consisting essentially of a trialkyl metal or a dialkyl metal halide compound and mixtures thereof, said trialkyl metal compound having the structure of $R'_3Y$ said dialkyl metal halide compound having the structure of $R'_2YX$ wherein R' is selected from the group consisting of $C_1$ to $C_{20}$ alkyl, branched alkyl, naphthenic or aralkyl groups, Y being selected from the group consisting of aluminum, gallium or indium and X being a halide group; and
   (c) a nitrogen-containing metal alkyl compound, a structure of said nitrogen-containing metal alkyl compound being selected from the group consisting of $R'_2YNR_2$ or $R'XYNR_2$ wherein Y being selected from the group consisting of Al, Ga or In, X being halide, R' being a $C_1$ to $C_{20}$ alkyl, branched alkyl, naphthenic or aralkyl group and R being selected from the group consisting of $C_3$ to $C_{10}$ bulky alkyl groups and cycloalkyl groups, with the proviso that the two R groups can be taken with N to form a pyrrolidyl or piperidyl and the alkyl substituted derivatives of pyrrolidyl and piperidyl, said compound being in a mole ratio of 0.05 to 5 moles of said compound to said transition metal halide.

2. The composition of claim 1, wherein Y is aluminum.

3. The composition of claim 1, wherein said alkyl metal cocatalyst is an alkyl aluminum cocatalyst at molar ratio of about 0.5 to about 1.5:1 based on said nitrogen containing metal alkyl compounds.

4. The composition of claim 3, wherein said nitrogen containing metal alkyl compound is diethylaluminum diisopropylamide.

5. The composition of claim 3, wherein said nitrogen containing metal alkyl compound is diethylaluminum dicyclohexylamide.

6. The composition of claim 1, wherein said transition metal halide is selected from the group consisting essentially of $TiCl_3$ on a support, $TiCl_4$ on a support, lowaluminum $TiCl_3$, cocrystallized $TiCl_3$ and mixtures thereof.

7. The composition of claim 1, wherein said metal alkyl cocatalyst is diethylaluminum chloride.

8. The composition of claim 1, wherein said transition metal halide is $TiCl_3$ having a low aluminum content.

* * * * *